US006808353B2

(12) United States Patent
Ostwald et al.

(10) Patent No.: US 6,808,353 B2
(45) Date of Patent: Oct. 26, 2004

(54) METHOD OF NON-DISRUPTIVE CAPACITY SCALING FOR A DATA STORAGE LIBRARY

(75) Inventors: Timothy C. Ostwald, Louisville, CO (US); Daniel James Plutt, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 227 days.

(21) Appl. No.: 10/033,878

(22) Filed: Dec. 19, 2001

(65) Prior Publication Data

US 2003/0113193 A1 Jun. 19, 2003

(51) Int. Cl.[7] .................................................. B65G 1/00
(52) U.S. Cl. ....................... 414/273; 414/807; 700/214; 369/30.39
(58) Field of Search ................................ 414/273, 807; 360/92; 369/30.39; 700/214

(56) References Cited

U.S. PATENT DOCUMENTS

| | | | |
|---|---|---|---|
| 4,817,070 A | | 3/1989 | Hug et al. |
| 5,108,246 A | * | 4/1992 | Baur ........................... 414/273 |
| 5,277,534 A | | 1/1994 | Anderson et al. |
| 5,479,581 A | * | 12/1995 | Kleinschnitz ............... 700/247 |
| 5,546,366 A | * | 8/1996 | Dang ........................ 369/30.39 |
| 5,610,882 A | * | 3/1997 | Dang ........................ 369/30.43 |
| 5,663,938 A | * | 9/1997 | Dang et al. ............... 369/30.39 |
| 5,818,723 A | * | 10/1998 | Dimitri ....................... 700/214 |
| 5,898,593 A | * | 4/1999 | Baca et al. .................. 700/214 |
| 5,940,356 A | * | 8/1999 | Toumbas ................. 369/30.39 |
| 6,061,309 A | | 5/2000 | Gallo et al. |
| 6,222,699 B1 | | 4/2001 | Luffel et al. .................. 360/92 |
| 6,314,338 B1 | | 11/2001 | Billington |
| 6,393,335 B1 | * | 5/2002 | Ostwald ..................... 700/214 |
| 6,416,270 B1 | * | 7/2002 | Steury et al. ............... 414/282 |
| 6,438,459 B1 | * | 8/2002 | Dimitri et al. .............. 700/255 |
| 6,438,623 B1 | * | 8/2002 | Ryan ............................. 710/2 |
| 6,457,928 B1 | * | 10/2002 | Ryan ........................... 414/281 |
| 6,493,604 B1 | * | 12/2002 | Kappel et al. .............. 700/213 |
| 6,494,663 B2 | * | 12/2002 | Ostwald et al. ............ 414/281 |
| 6,591,164 B1 | * | 7/2003 | Plutt et al. ................... 700/245 |
| 6,602,039 B1 | * | 8/2003 | Dimitri et al. .............. 414/281 |
| 6,609,046 B2 | * | 8/2003 | Ostwald et al. ............ 700/214 |
| 6,621,655 B2 | * | 9/2003 | White et al. .................. 360/92 |
| 2002/0012579 A1 | * | 1/2002 | White ........................ 414/273 |
| 2002/0168252 A1 | * | 11/2002 | Williams .................... 414/277 |
| 2003/0063966 A1 | * | 4/2003 | Apple et al. ................ 414/273 |
| 2003/0210493 A1 | * | 11/2003 | Smith et al. ............. 360/98.06 |

* cited by examiner

*Primary Examiner*—James W. Keenan
(74) *Attorney, Agent, or Firm*—Yee & Associates, P.C.

(57) ABSTRACT

A method for scaling a media storage library is provided, wherein the library comprises a plurality of media storage cells and at least one media picker robot. The method comprises connecting a new physical component to a section of the library. Examples of new components include additional robots, storage cell arrays, media players, as well as connecting a second adjacent library by means of a pass-through mechanism. Control software integrates this new physical component into the function of the library by auditing the content and function of the new component. During the connection and functional integration of the new component, the rest of the library continues its current operations. The method may further comprise defining at least one work zone within the library, wherein robots do not enter the work zone but continue to operate in other areas of the library.

18 Claims, 6 Drawing Sheets

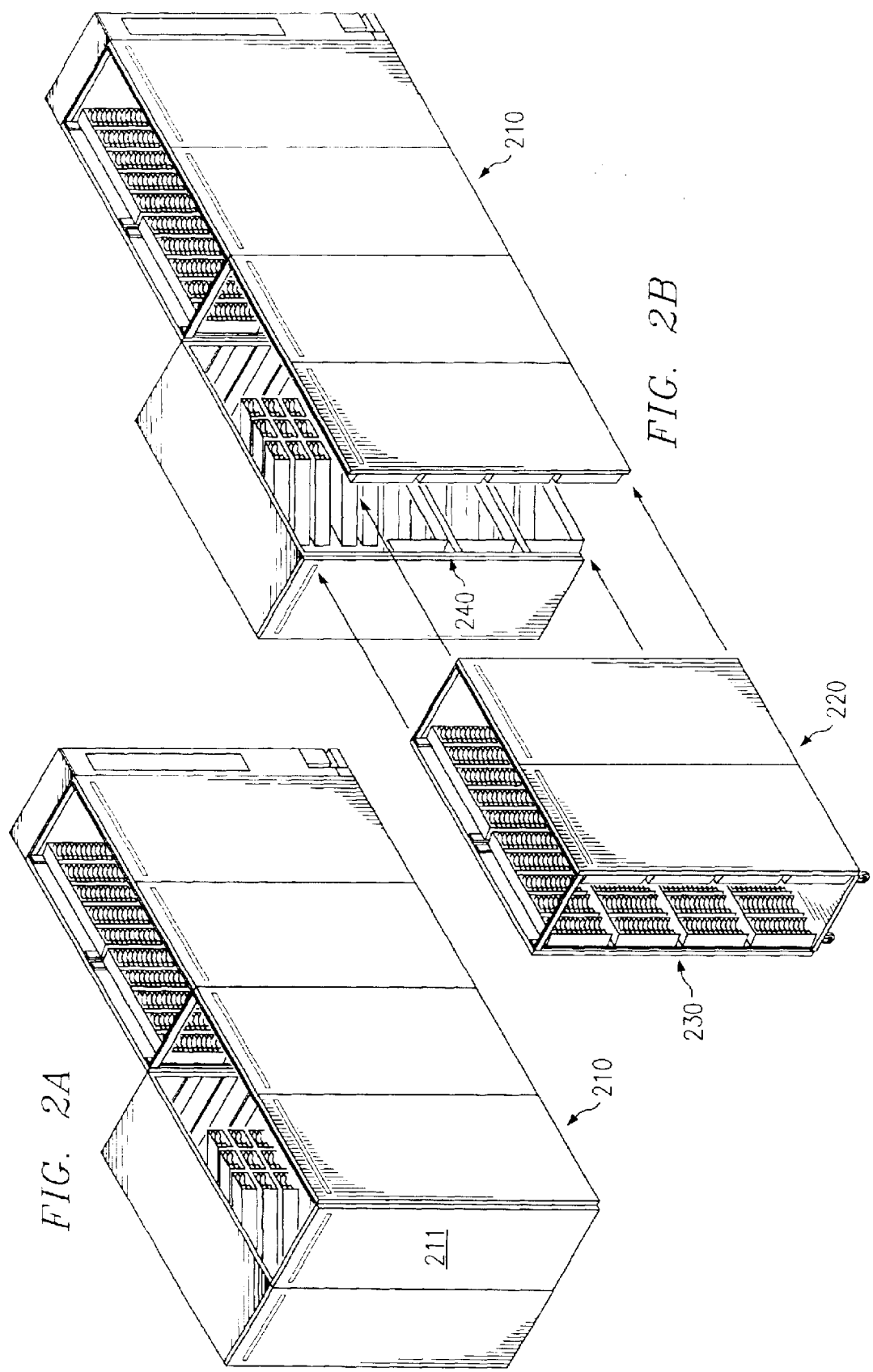

METHOD OF NON-DISRUPTIVE CAPACITY SCALING FOR A DATA STORAGE LIBRARY

BACKGROUND OF THE INVENTION

1. Field of the Invention

The present invention relates generally to robotic media storage library systems, and more specifically to a redundant system that includes a plurality of independent robots in the form of robotic pods.

2. Background of the Invention

The current enterprise class library system contains multiple independent robots for concurrently manipulating multiple media cartridges. The library system comprises an array of media storage cells and media cartridge players. A system of rails is used to guide robotic pods through all of the locations on the array.

Scalable library systems typically incorporate additional robotic mechanisms and related electromagnetic hardware to increase the size of a system. Some large systems use "pass through" mechanisms to pass cartridges between individual silos to increase the capacity of the system. Pass through mechanisms are field upgradeable, although the library system must be shut down to allow service personnel inside the enclosure(s) during installation. A silo is a "closed" shape that does not allow for capacity scaling without pass through.

Therefore it would be desirable to have a method for expanding library system capacity without disrupting normal library operations.

SUMMARY OF THE INVENTION

The present invention provides a method for scaling a media storage library, wherein the library comprises a plurality of media storage cells and at least one media picker robot. The method comprises connecting a new physical component to a section of the library. Examples of new components include additional robots, storage cell arrays, media players, as well as connecting a second adjacent library by means of a pass-through mechanism. Control software integrates this new physical component into the function of the library by auditing the content and function of the new component. During the connection and functional integration of the new component, the rest of the library continues its current operations. The method may further comprise defining at least one work zone within the library, wherein robots do not enter the work zone but continue to operate in other areas of the library.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
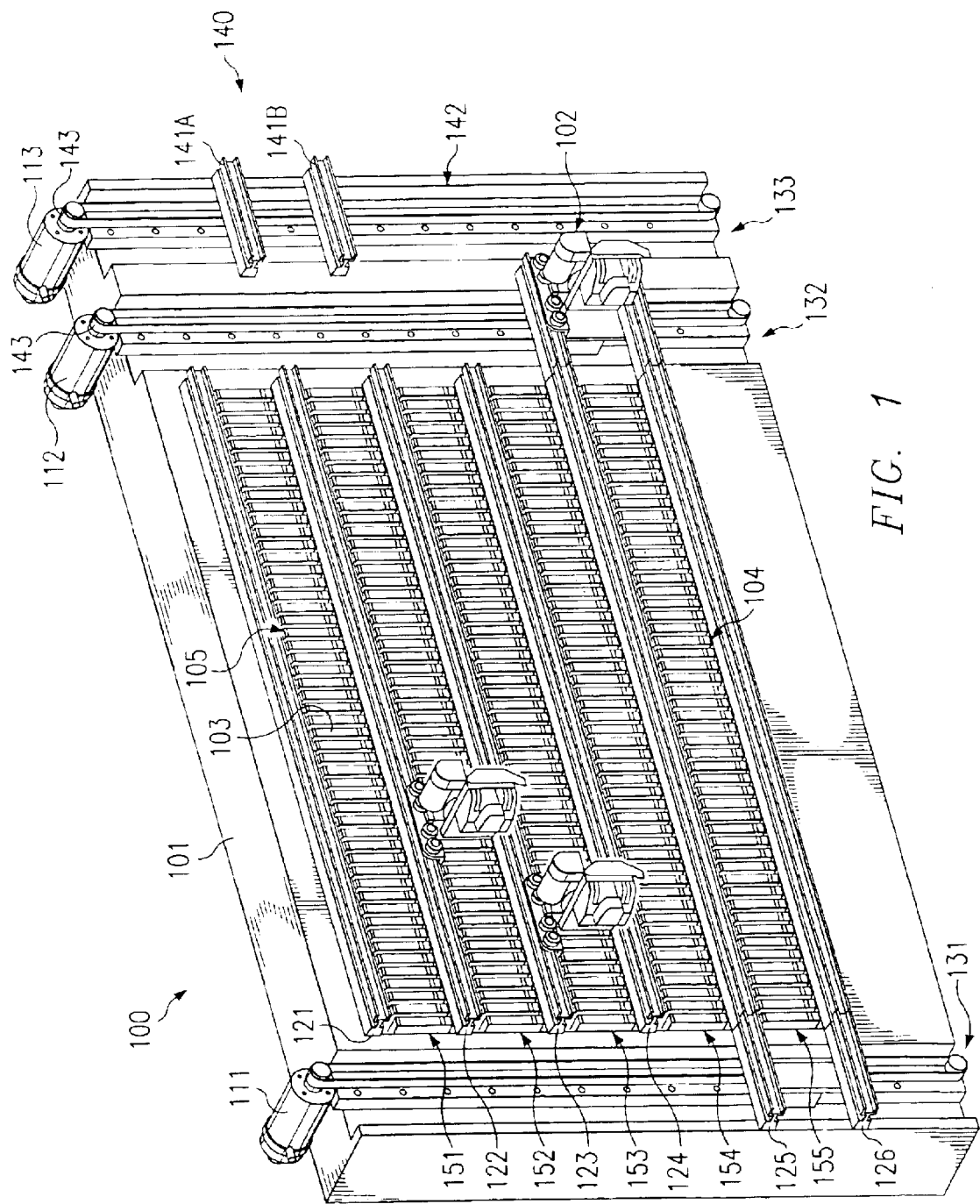
FIG. 1 depicts a perspective pictorial diagram illustrating the architecture of a single library storage array in accordance with the present invention.

The architecture of the present automated library array 100 is illustrated in FIG. 1 and contains the multiple independent robots 102 to enable the library array 100 to concurrently manipulate multiple media cartridges 105. The library array 100 comprises a two-dimensional array of media cartridge storage cells 103 and media cartridge players 104 that are mounted in a frame 101. A system of rails 121–126 is used to guide robotic pods 102 through all of the locations in the array, which eliminates the need for any steering or guide mechanisms on board the robotic pods 102, resulting in a reduction in the mass of the robotic pods 102. The rail system 121–126 also constrains the movement of the robotic pods 102 into horizontal and vertical movements, thereby simplifying the control algorithms for collision avoidance that are required by a typical random moveable object handling system based on horizontal, vertical and diagonal degrees of freedom. The robotic pods 102 contain a moveable carriage that is capable of transporting robotic components, such as media cartridge pickers, bar code reading devices, and other task oriented sub-units, on the storage library rail system.

As shown in FIG. 1, the frame 101 is designed to receive a plurality of rows 151–154 of media cartridge storage cells 103, each of which is designed to house a single media cartridge 105. The media cartridge players 104 are shown in an arbitrary location in a horizontal row 155 at the bottom of the frame 101, although the library array 100 can incorporate media cartridge players 104 at any location in the frame 101 to optimize performance. The robotic pods 102 are attached to the frame 101 via horizontal guide rails 121–126, which serve to frame the media cartridge storage cells 103 and media cartridge players 104 on the top and bottom sides thereof. FIG. 1 shows an array of media storage cells 103 fully populated with media cartridges 105 of any arbitrary type. The robotic pod guide rails 121–126 provide support of the robotic pods 102 in the vertical direction to oppose the force of gravity, and they also provide a meshing surface of suitable design to impart traction in the horizontal direction for motive transport of the robotic pods 102. The robotic pods 102 each incorporate a drive means for propulsion in the horizontal direction along the guide rails 121.

FIG. 1 also shows a plurality of vertical elevator assemblies 131–133 that enable the transfer of the robotic pods 102 in the vertical direction. Multiple vertical elevator assemblies 131–133 are shown in FIG. 1 to exemplify the extensibility and redundancy of the invention. Each of the vertical elevator assemblies 131–133 comprise a set of vertical rails 142 that extend substantially from the top of the frame 101 to the bottom of the frame 101. The vertical rails 142 support a plurality of elevator stations 140, each of which contain short horizontal rail segments 141A, 141B that are identical in cross section to the main horizontal guide rails 121–126. The elevator stations 140 are held in suspension by a drive belt 143 which is made to wrap around a drive pulley attached to a vertical drive motor 113 that is located at the top of each elevator assembly 133. When a vertical displacement is required of any robotic pod 102, the vertical elevator 140 is scheduled to move in alignment to the appropriate level of rows 151–155 to allow transfer of the robotic pod 102 onto the elevator rail section 141A, 141B from the pair of horizontal rails 121–126 that are juxtaposed and abutting to the elevator rails 141A, 141B. Once the robotic pod 102 is located on the elevator station 140, the drive motor 113 is activated to transport the robotic pod 102 to a selected one of rows 151–155 and thence moves on to the pair of horizontal rails 121–126 that correspond to the selected row. Elevator assemblies 131–133 can carry more than one robotic pod 102 at a time by adding elevator platforms 140 to the elevator assemblies 131–133 or by extending the elevator platform length to accommodate multiple robotic pods 102 on a single elevator station 140.

Figure 2C:
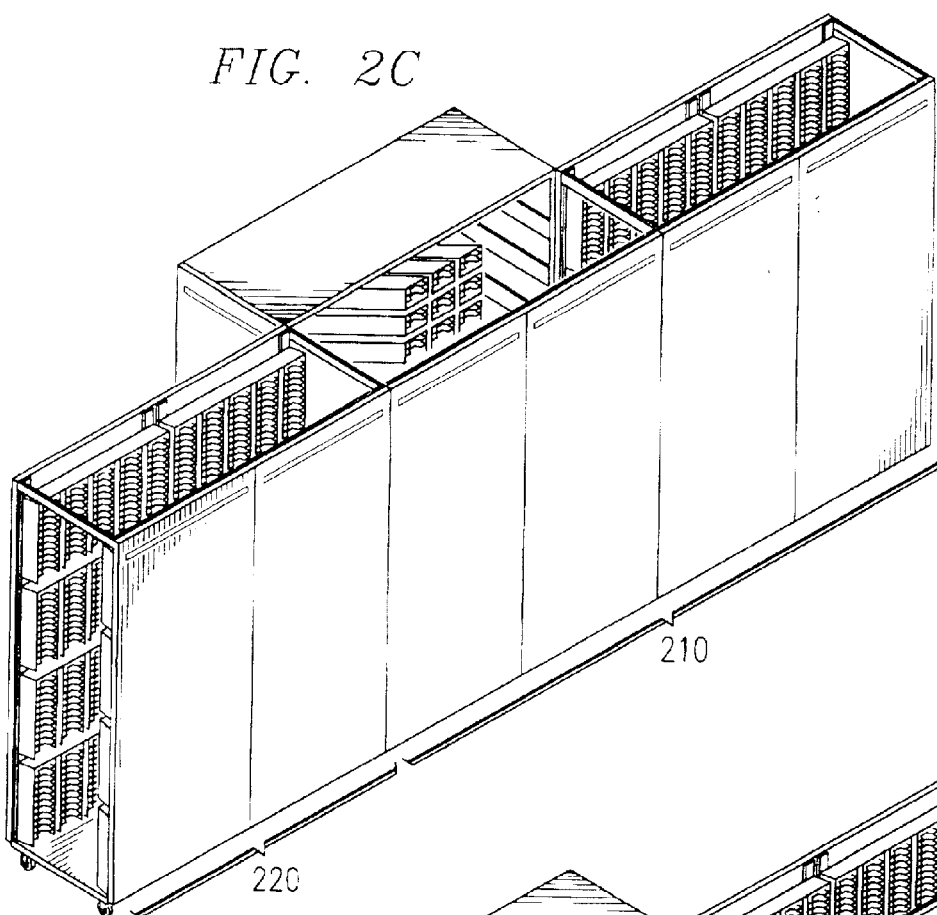
FIG. 2 depicts a pictorial diagram illustrating the addition of an extension array to an existing library system in accordance with the present invention.
Figure 2D:
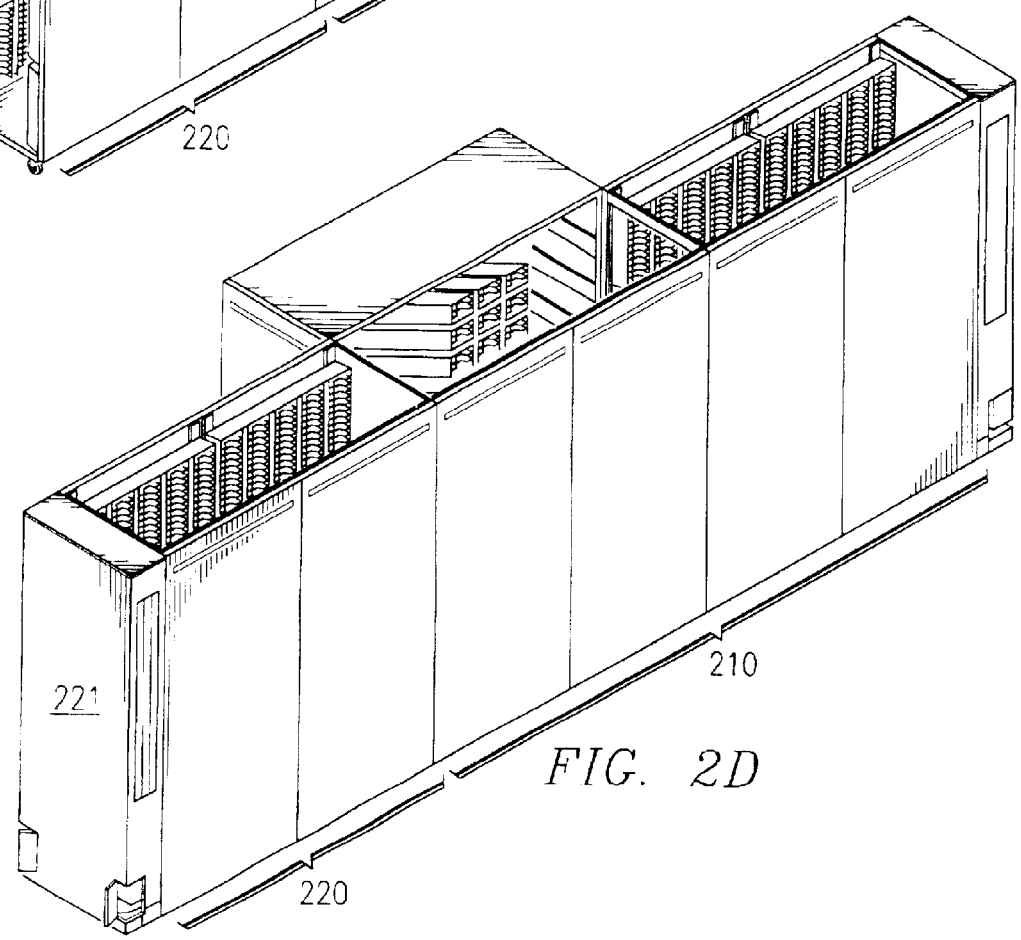

Referring to FIG. 2, a pictorial diagram illustrating the addition of an extension array to an existing library system is depicted in accordance with the present invention. The library system 210 depicted in FIGS. 2A–2D is comprised of several library arrays, similar to array 100 in FIG. 1, which are arranged in banks. The track type architecture used with the storage arrays (depicted in FIG. 1) allows the arrays to be connected within a single library system, wherein "roaming" robots can move between arrays by following connecting tracks, which trace cartridge locations and tape drives within the library system.

Figure 3:
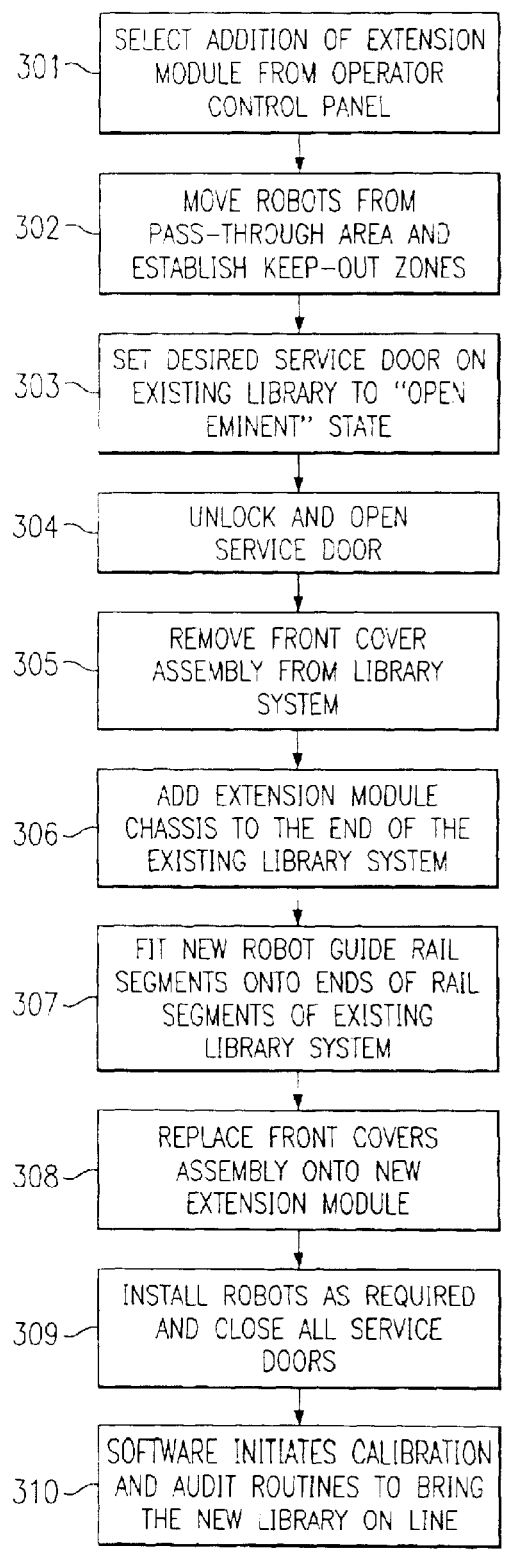
FIG. 3 depicts a flowchart illustrating the procedure for adding an extension array to an existing library system in accordance with the present invention.

FIG. 3 depicts a flowchart illustrating the procedure for adding an extension array to an existing library system. The procedure begins by selecting, via an operator control panel, the desired capacity scaling method, which in the present example is the addition of an extension array 220 onto an existing library system 210 (step 301). The selection causes the control software to move robots away from the end of the rail location where the extension 220 is being added, and establishes the working space as a "keep-out" zone for the robots (step 302). In this way, robots within the existing library system 210 can continue to operate in other areas of the library, without interfering with the addition of the extension array 220. The operator panel is then used to set the relevant service door to an "open-eminent" state, thus alerting the control software to clear the robots from the work area (step 303).

A door key is then used to unlock and open the service door (step 304). The front cover assembly 211 is removed from the end of the library system 210 where the extension 220 is to be added (step 305), and the extension array 220 is added to the existing library system 210 (step 306). The robot guide rail segments of the extension array, e.g., rail 230, are then fit to the guide rails on the existing library, e.g., rail 240, thus connecting power to all segments (step 307). A front cover assembly 221 is placed onto the end of the extension array 220 (step 308). Additional robots can then be added as needed before the service door is closed (step 309).

After the physical components have been connected and the service doors have been closed, the operator panel is used to notify the control software to initiate calibration and audit routine to bring the extension array on line with the preexisting library system (step 310).

When integrating new silos and arrays into an expansionable library system, specific control algorithms are used to facilitate seamless integration. These control algorithms allow the library system to automatically detect new components and determine which resources are available to the system at any time. The algorithms may rely on meta data, which is an inventory of resources available to an array at any given time and is maintained on a micro basis (short time periods). Examples of meta data include: what data storage devices are located within an array; where the storage arrays are located; and how many robots are presently on the array and where they are located, which can change every few fractions of a second as robots move from one array to another. When adding new components to a library system, it is important to merge and integrate the meta data from the different components. When a component is removed, the meta data is uncoupled. Meta data can be stored in NV-RAM, on a hard drive, or any other type of non-volatile memory storage within the arrays, which can hold its memory without power.

By implementing the control algorithms described above, there is no need to shut down the library system 210 in order to add new physical components (i.e. extension 220). The host system 210 will automatically detect these new components and incorporate their function and contents into ongoing system operations.

Figure 5:
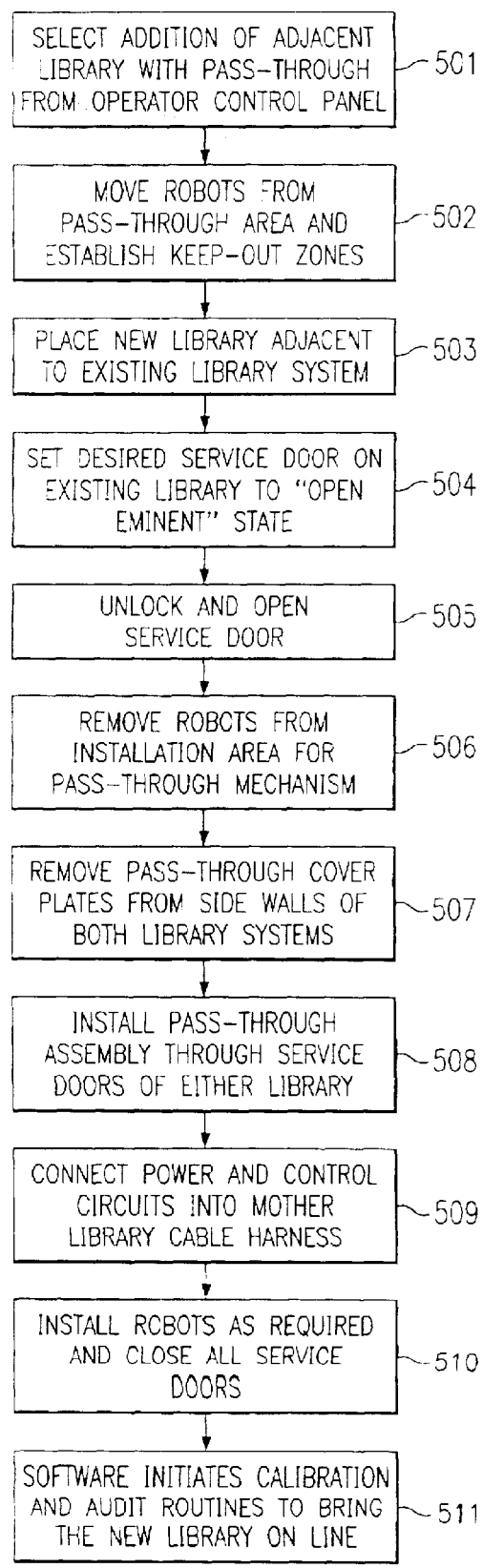
FIG. 5 depicts a flowchart illustrating the procedure for adding a new library system to an existing library system in accordance with the present invention.
Figure 4A:
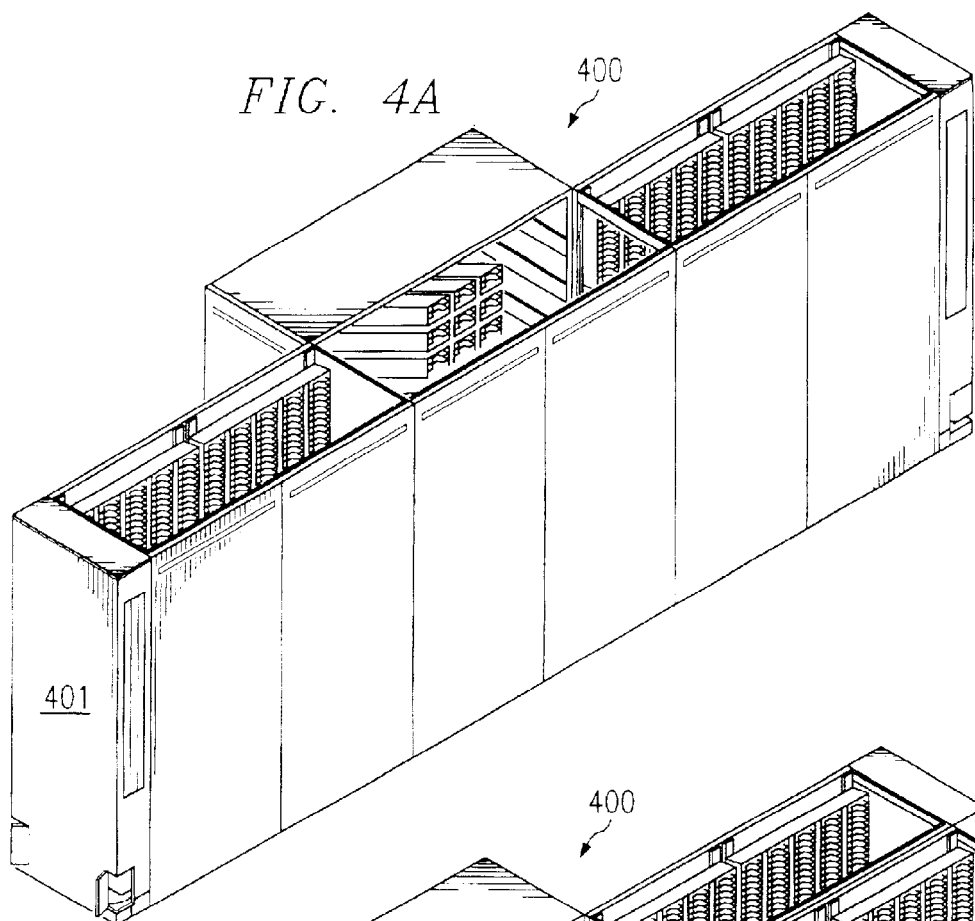
FIG. 4 depicts a pictorial diagram illustrating the addition of a new library system to an existing library system in accordance with the present invention.
Figure 4C:
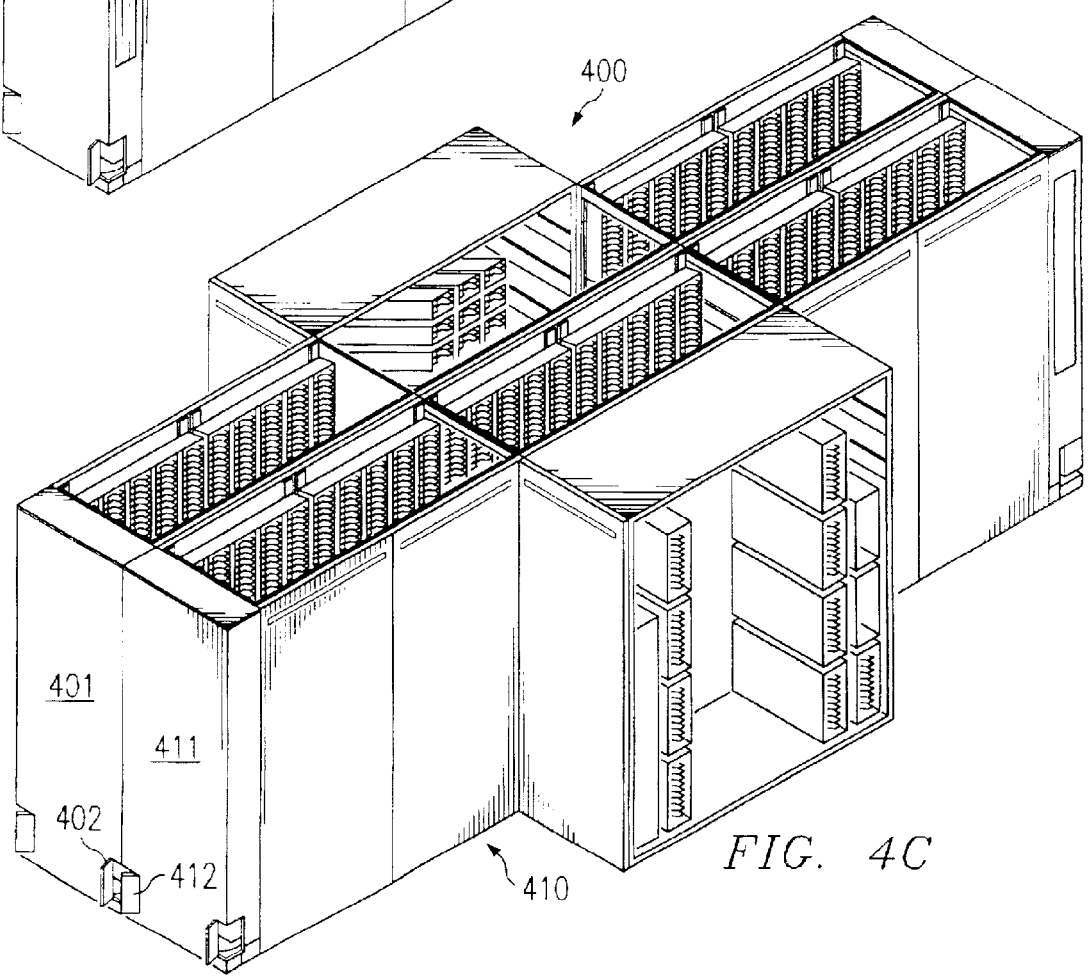
Figure 4B:
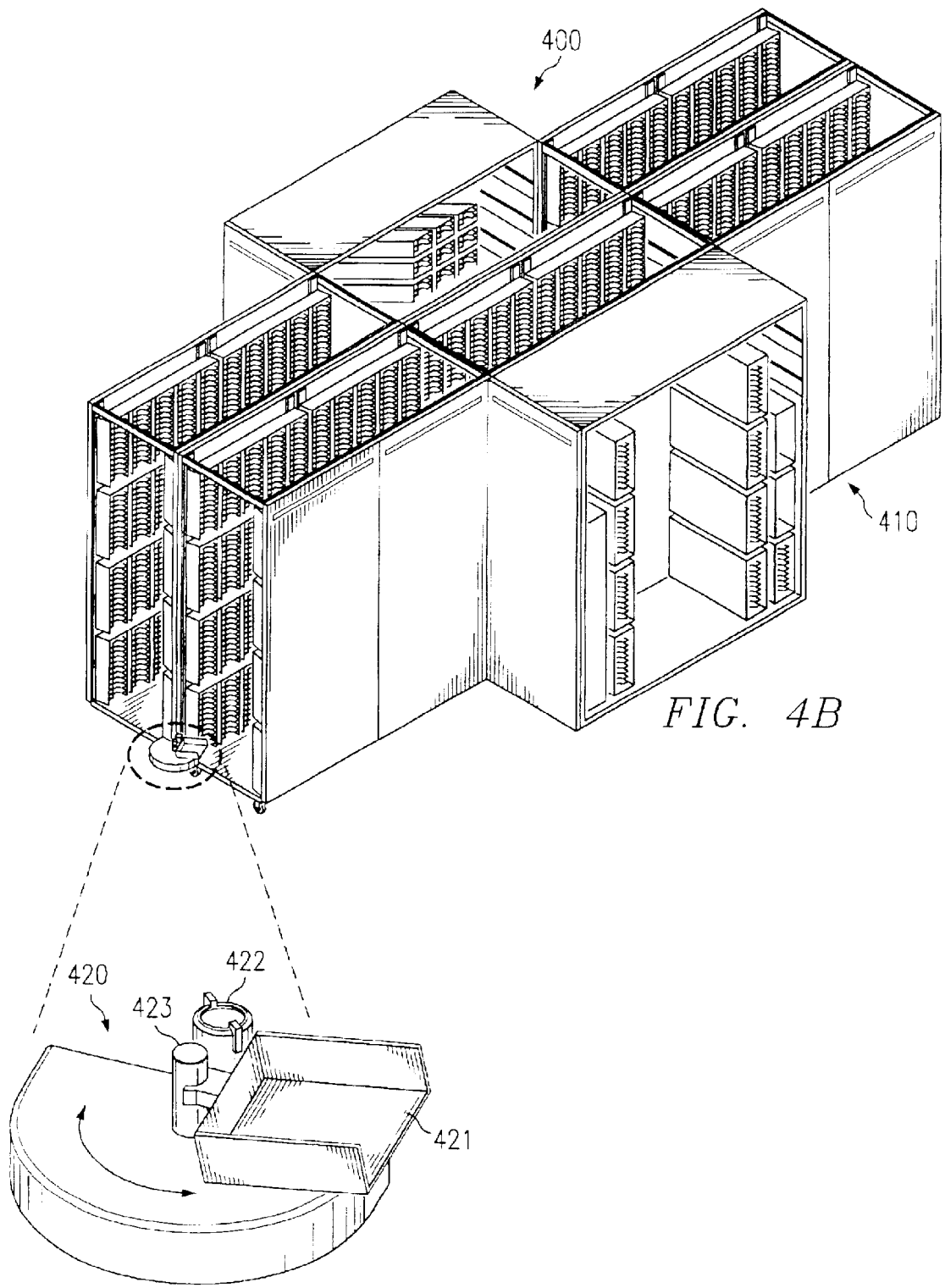

Referring to FIG. 4, a pictorial diagram illustrating the addition of a new library system to an existing library system is depicted in accordance with the present invention. FIG. 5 depicts a flowchart illustrating the procedure for adding the new library system. The procedure begins by selecting, via an operator control panel, the desired capacity scaling method, which in the present example is the addition of an adjacent library 410 with a pass-through mechanism 420 (step 501). The selection causes the control software to move robots away from the end of the rail location where the adjacent library 410 is to be connected, and establishes the working space as a "keep-out" zone for the robots (step 502). In this way, robots within the existing library system 400 can continue to operate in other areas of the library, without interfering with the connection of the adjacent library 410 and the installation of the pass-through mechanism 420. The new library system 410 is then placed next to the original existing library 400 (step 503).

The operator panel is then used to set the relevant service door 402 to an "open-eminent" state, thus alerting the control software to clear the robots from the work area (step 504). A door key is then used to unlock and open the service door where the pass-through mechanism is going to be placed between the library systems (step 505).

The operator should remove any robots from the work area where the pass-through mechanism is to be installed (step 506). The pass-through cover plates 401 and 411 are removed from the side walls of the libraries, thereby allowing the pass-through mechanism 420 access to both library systems 400 and 401 (step 507), and the passthrough mechanism 420 is installed by means of the service doors 402 and 412 of either library (step 508).

The pass-through mechanism 420 allows cartridges to be passed between the adjacent libraries 400 and 410 by means of a bucket 421, which is driven about a pivot axis 423 by a motor 422.

The power and control circuits of the new adjacent library 410 are then connected to the cable harness of the mother library 400 (step 509). Unlike the addition of an extension array, the connection of adjacent libraries does not require the operator to fit guide rail segments between the adjacent libraries. This is because each library is physically self-contained, except for the pass-through mechanism.

Once the libraries 400 and 410 are connected, robots are replaced and/or added as needed and the service doors 402 and 412 are closed (step 510). The operator control panel is used to notify the control software to initiate calibration and audit routine to bring the new adjacent library 410 on line with the original mother library system 400 (step 511).

As with addition of extension arrays, by implementing the control algorithms described above, there is no need to shut down the mother library system 400 in order to add new library 410. The host system 400 will automatically detect the new library 410 and incorporate its function and contents into ongoing system operations.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for scaling a media storage library, wherein the library comprises a plurality of media storage cells and at least one media picker robot, the method comprising:

connecting a new physical component to a section of the library, wherein tracks of the library and the new physical component are joined to form joined tracks, and wherein the joined tracks allow the at least one media picker robot access to each media storage cell in the library and the new physical component; and integrating the new physical component into the function of the library by auditing the content and function of the new physical component;

wherein the library maintains current operation during the connection and functional integration of the new physical component.

2. The method according to claim 1, wherein the new physical component is a picker robot.

3. The method according to claim 1, wherein the new physical component is a storage cell array.

4. The method according to claim 1, wherein the new physical component is a media player.

5. The method according to claim 1, wherein the new physical component is a second storage library.

6. The method according to claim 5, wherein the storage libraries are connected by means of a pass-through mechanism that passes media cartridges between picker robots in the respective libraries.

7. The method according to claim 1, further comprising: defining at least one work zone within the library, wherein the at least one media picker robot stays out of the work zone, while continuing to operate in oilier areas of the library.

8. The method according to claim 7, wherein the defined work zone is associated with an open service door in an enclosure surrounding the library components.

9. The method according to claim 1, wherein the at least one media picker robot in the media storage library moves along the jointed tracks.

10. The method according to claim 1, wherein the media storage library further comprises a plurality of picker robots.

11. A scalable media storage library system, comprising:

a plurality of media storage cells within a library; and a set of tracks, where the set of tracks allow at least one media picker robot to access each media storage cell in the plurality of media storage cells;

wherein the plurality of media storage cells and the set of tracks allow for connection of a new physical component to a section of the library; and wherein tracks of the library and the new physical component are joined to form joined tracks in which the joined tracks allow the at least one media picker robot access to the new physical component in addition to the plurality of media storage cell;

wherein the new physical component is integrated into the function of the library by auditing the content and function of the new physical component; and wherein the library maintains current operation during the connection and functional integration of the new physical component.

12. The system according to claim 11, wherein the new physical component is a storage cell array.

13. The system according to claim 11, wherein the new physical component is a media player.

14. The system according to claim 11, wherein the new physical component is a second storage library.

15. The system according to claim 14, wherein the storage libraries are connected by means of a pass-through mechanism that passes media cartridges between picker robots in the respective libraries.

16. The system according to claim 11, further comprising:

at least one work zone within the library, wherein the at least one picker robot stays out of the work zone, while continuing to operate in other areas of the library.

17. The system according to claim 16, wherein the work zone is associated with an open service door in an enclosure surrounding the library components.

18. The system according to claim 11, wherein the at least one picker robot in the media storage library moves along the joined tracks.

* * * * *